US010924722B2

(12) United States Patent
Talstra et al.

(10) Patent No.: US 10,924,722 B2
(45) Date of Patent: *Feb. 16, 2021

(54) TRANSFERRING OF THREE-DIMENSIONAL IMAGE DATA

(71) Applicant: KONINKLIJKE PHILIPS N.V., Eindhoven (NL)

(72) Inventors: Johannes Cornelis Talstra, Eindhoven (NL); Gerardus Wilhelmus Theodorus Van der Heijden, Eindhoven (NL); Philip Steven Newton, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/931,686

(22) Filed: May 14, 2020

(65) Prior Publication Data
US 2020/0314404 A1  Oct. 1, 2020

Related U.S. Application Data

(63) Continuation of application No. 15/582,789, filed on May 1, 2017, now Pat. No. 10,742,953, which is a
(Continued)

(30) Foreign Application Priority Data

Jan. 20, 2009 (EP) .................................... 09150939
Jan. 20, 2009 (EP) .................................... 09150947
Jan. 27, 2009 (EP) .................................... 09151461

(51) Int. Cl.
*H04N 13/161* (2018.01)
*H04N 13/139* (2018.01)
(Continued)

(52) U.S. Cl.
CPC ......... *H04N 13/161* (2018.05); *H04N 13/139* (2018.05); *H04N 13/167* (2018.05);
(Continued)

(58) Field of Classification Search
None
See application file for complete search history.

(56) References Cited

U.S. PATENT DOCUMENTS 4,979,033 A    12/1990  Stephens
5,809,201 A *  9/1998  Nagasawa .............. H04N 19/61
                                                 386/314
(Continued)

FOREIGN PATENT DOCUMENTS

JP    2006195018 A    7/2006
WO    2006137000 A1   12/2006
(Continued)

OTHER PUBLICATIONS

High Definition Multimedia Interface Specification Verison 1.3A, Nov. 10, 2006, O, II-156 and Supplemnt 1 Consumer Electronics Control (CEC) pp. II-97.
Fehn, Christoph, Depth-Image Based Rendering (DIBR) Compressioini and Transmission for a New Approach on 3D TV 2004.

*Primary Examiner* — Daniel Chang

(57) ABSTRACT

A three-dimensional source device provides a three-dimensional display signal for a display via a high speed digital interface, such as HDMI. The three-dimensional display signal comprises a sequence of frames. The sequence of frames comprises units, each unit corresponding to frames comprising video information intended to be composited and displayed as a three-dimensional image. The three-dimensional source device includes three-dimensional transfer information comprising at least information about the video frames in the unit. The display detects the three-dimensional transfer information, and generates the display
(Continued)

control signals based in dependence on the three-dimensional transfer information. The three-dimensional transfer information in an additional info frame packet comprises information about the multiplexing scheme for multiplexing frames into the three-dimensional display signal, the multiplexing scheme being selected of group of multiplexing schemes including frame alternating multiplexing, the three-dimensional transfer information indicating the number of frames being sequentially arranged within the video data period.

20 Claims, 6 Drawing Sheets

Related U.S. Application Data continuation-in-part of application No. 13/145,420, filed as application No. PCT/IB2010/050141 on Jan. 14, 2010, now abandoned.

(51) Int. Cl.
| | | |
|---|---|---|
| H04N 13/167 | (2018.01) | |
| H04N 13/332 | (2018.01) | |
| H04N 13/178 | (2018.01) | |
| H04N 13/302 | (2018.01) | |
| H04N 13/194 | (2018.01) | |

(52) U.S. Cl.
CPC ......... *H04N 13/178* (2018.05); *H04N 13/194* (2018.05); *H04N 13/302* (2018.05); *H04N 13/332* (2018.05)

(56) References Cited

U.S. PATENT DOCUMENTS

| | | | | |
|---|---|---|---|---|
| 6,571,024 | B1* | 5/2003 | Sawhney | ................ G06T 7/246 |
| | | | | 348/42 |
| 6,788,333 | B1* | 9/2004 | Uyttendaele | ....... H04N 5/23238 |
| | | | | 348/36 |
| 2002/0030675 | A1 | 3/2002 | Kawai | |
| 2003/0128273 | A1 | 7/2003 | Matsui | |
| 2004/0120396 | A1* | 6/2004 | Yun | ..................... H04N 13/356 |
| | | | | 375/240.01 |
| 2007/0008575 | A1 | 1/2007 | Yu | |
| 2007/0165304 | A1 | 7/2007 | Tomita | |
| 2007/0195408 | A1 | 8/2007 | Divelbiss | |
| 2007/0296859 | A1 | 12/2007 | Suzuki | |
| 2008/0152241 | A1 | 6/2008 | Itoi | |
| 2008/0303893 | A1* | 12/2008 | Kim | ..................... H04N 13/178 |
| | | | | 348/42 |
| 2009/0066783 | A1* | 3/2009 | Lee | ..................... H04N 13/161 |
| | | | | 348/43 |
| 2009/0142041 | A1* | 6/2009 | Nagasawa | ............. H04N 19/46 |
| | | | | 386/341 |
| 2009/0195640 | A1* | 8/2009 | Kim | ..................... H04N 13/156 |
| | | | | 348/43 |
| 2009/0202227 | A1* | 8/2009 | Jang | .................... H04N 19/597 |
| | | | | 386/248 |
| 2009/0220213 | A1 | 9/2009 | Ogawa | |
| 2011/0157310 | A1 | 6/2011 | Mitani et al. | |

FOREIGN PATENT DOCUMENTS

| | | |
|---|---|---|
| WO | 2008069613 A1 | 6/2008 |
| WO | 2009077969 A1 | 6/2009 |
| WO | 2009113761 A1 | 9/2009 |
| WO | 2010084436 A1 | 7/2010 |

* cited by examiner

TRANSFERRING OF THREE-DIMENSIONAL IMAGE DATA

This application is a continuation of U.S. patent application Ser. No. 15/582,789 filed May 1, 2017 which is a Continuation-In-Part of U.S. patent application Ser. No. 13/145,420, which is incorporated in its entirety by reference herein, and which is the National Stage of PCT/IB10/50141, 30 Nov. 2011, which claims the benefit of EP09150939.8, 20 Jan. 2009; EP09150947.1, 20 Jan. 2009; and EP09141461.2, 27 Jan. 2009.

FIELD OF THE INVENTION

The invention relates to a method of transmitting a three-dimensional display signal for transferring three dimensional (3D) image data to a 3D display device, the 3D display signal comprising a sequence of frames constituting the 3D image data according to a 3D video transfer format, the sequence of frames comprising units, each unit corresponding to frames comprising video information video information intended to be composited and displayed as a 3D image.

The invention further relates to the above mentioned 3D source device, the 3D display signal, and the 3D display device.

The invention relates to the field of transferring, via a high-speed digital interface, e.g. HDMI, three-dimensional image data, e.g. 3D video, for display on a 3D display device.

BACKGROUND OF THE INVENTION

Devices for sourcing 2D video data are known, for example video players such as DVD players or set top boxes that provide digital video signals. The source device is coupled to a display device, such as a TV set or monitor. Image data is transferred from the source device via a suitable interface, preferably a high-speed digital interface such as High-Definition Multimedia Interface (HDMI). Currently, 3D enhanced devices for sourcing three-dimensional (3D) image data are being proposed. Similarly, devices for displaying 3D image data are being proposed. For transferring the 3D video signals from the source device to the display device, new high data rate digital interface standards are being developed, e.g. based on and compatible with the existing HDMI standard.

Transferring 2D digital image signals to the display device usually involves sending the video pixel data frame by frame, which frames are to be displayed sequentially. Such frames may either represent video frames of a progressive video signal (full frames) or may represent video frames of an interlaced video signal (based on the well-known line interlacing, wherein one frame provides the odd lines and the next frame provides the even lines to be displayed sequentially).

U.S. Pat. No. 4,979,033, which is incorporated by reference, describes an example of traditional video signal having an interlaced format. The traditional signal includes horizontal and vertical synchronization signals for displaying the lines and frames of the odd and even frames on a traditional television. A stereoscopic video system and method are proposed that allow synchronization of stereoscopic video with a display that uses shutter glasses. The odd and even frames are used to transfer respective left and right images of a stereoscopic video signal. The proposed 3D display device comprises a traditional envelope detector that detects the traditional odd/even frames, but instead generates display signals for left and right LCD display units from these frames. In particular, equalization pulses occurring during the vertical blanking interval, which differ for odd and even frames in the traditional interlaced analog video signal, are counted to identify the respective left or right field. The system uses this information to synchronize a pair of shutter glasses, such that the shutter glasses alternately open and close in sync with the stereo video.

There are many different ways in which stereo images may be formatted, called a 3D image format. Some formats are based on using a 2D channel to also carry the stereo information. For example, the left and right view can be interlaced, or can be placed side by side, or above and under. These methods sacrifice resolution to carry the stereo information. Another option is to sacrifice color, this approach is called anaglyphic stereo.

New formats for transmitting 3D information to a display are being developed. MVD, as being standardized in MPEG, for example, calls for transmitting {Video+Depth} for M views, to allow a larger view cone.

SUMMARY OF THE INVENTION

It is an object of the invention to provide to a more flexible and reliable system for transferring of 3D video signals to a display device.

For this purpose, according to a first aspect of the invention, in the method as described in the opening paragraph, a 3D display signal is output from a source device using a 3D video format comprising a video data period during which pixels of active video are transmitted, and a data island period during which audio and auxiliary data are transmitted using a series of packets, the packets including an info frame packet. The method further includes, at a 3D display device, receiving the 3D display signal and processing the 3D display signal to generate display control signals for rendering the 3D image data on a 3D display.

Within the 3D video format, the sequence of frames comprises units, each unit being a period from a vertical synchronization signal to the next vertical synchronization signal, each unit corresponding to a number of frames arranged according to a multiplexing scheme. The frames of each unit comprise the video information intended to be composited and displayed as a 3D image. Each frame in the unit is of a particular frame type that has a 3D data structure for representing a sequence of digital image pixel data.

At the 3D source device, 3D transfer information is included in an additional info frame packet, the 3D transfer information comprising at least information about the multiplexing scheme, including the number of video frames in a next unit in the 3D display signal. The multiplexing scheme is selected from a group of multiplexing schemes comprising at least frame alternating multiplexing. The 3D display device uses the 3D transfer information to generate the display control signals for rendering each unit in the 3D display signal.

According to a second aspect of the invention, the 3D source device for transferring of 3D image data to a 3D display device processes source image data to generate a 3D display signal that is communicated to the 3D display device. The 3D display signal comprises a sequence of frames constituting the 3D image data according to a 3D video transfer format. The 3D video transfer format comprises a video data period during which pixels of active video are transmitted and a data island period during which audio and auxiliary data are transmitted using a series of packets, the packets including an info frame packet, including the number of frames in the next sequence of frames.

Each frame of the sequence of frames is of a particular frame type that has a 3D data structure for representing a sequence of digital image pixel data. The 3D display signal comprises a sequence of units, each unit comprising a sequence of a given number of frames arranged according to a multiplexing scheme. Each unit is within a period from a vertical synchronization signal to the next vertical synchronization signal, each unit comprising video information intended to be composited and displayed as a 3D image.

The 3D transfer information is included in the info frame packet, and comprises at least information about the multiplexing scheme, including the number of video frames in a next unit in the 3D display signal. The multiplexing scheme is selected from a group of multiplexing schemes comprising at least frame alternating multiplexing. At the display device, display control signals are generated in dependence on the 3D transfer information to render each unit in the 3D display signal.

According to a further aspect of the invention, the 3D display device data comprises a 3D display for displaying 3D image data, an input interface for receiving a 3D display signal, the 3D display signal comprising frames constituting the 3D image data according to a 3D video transfer format, the 3D video transfer format comprising a video data period during which pixels of active video are transmitted and a data island period during which audio and auxiliary data are transmitted using a series of packets, the packets including an info frame packet. The 3D display device generates display control signals for rendering the 3D image data on the 3D display.

Each frame of the 3D display signal is of a particular frame type that has a 3D data structure for representing a sequence of digital image pixel data. The 3D display signal comprises a sequence of units, each unit comprising a period from a vertical synchronization signal to the next vertical synchronization signal. Each unit corresponds to a given number of frames arranged according to a multiplexing scheme, and comprises the video information intended to be composited and displayed as a 3D image. The info frame packet includes 3D transfer information comprising at least information about the multiplexing scheme, including the number of video frames in the next unit in the 3D display signal. The multiplexing scheme is selected from a group of multiplexing schemes comprising at least frame alternating multiplexing and the display device generates display control signals in dependence on the 3D transfer information.

The invention is also based on the following recognition. Unlike 2D video information, there are many possibilities for formatting 3D video data, for example stereoscopic, image+depth, possibly including occlusion and transparency, multiple view, and so on. Moreover, it is envisioned that multiple 3D video data layers may be transmitted over an interface for compositing before displaying. This multitude of options leads to many video format options, depending of the format of the data available at the source device and the 3D video format accepted by the display. Most of these formats are characterized by a large volume of information, in a complex structure that needs to be transmitted for each of the 3D images to be displayed. Of particular note, different multiplexing schemes may occur in different units of the 3D video data, including, for example, 2D video data; and, the same multiplexing scheme may be used to encode units comprising different numbers of frames.

In an embodiment of the invention, when the data is sent in units, and information about the units is available in the 3D display signal for each unit, the transmission system is more flexible in handling various 3D data formats, as more data, or differently formatted data, can be included in a unit. Modern high speed interfaces allow sending frames at a frequency that is much higher than the actual frequency of the 3D images, usually 24 Hz as used by the cinematographic industry. By using units of frames, a higher volume of data, in flexible formats, for each 3D image can be sent over the interface.

In an embodiment, the group of multiplexing schemes further comprises at least one of field alternating multiplexing; line alternating multiplexing; side by side frame multiplexing; 2D and depth frame multiplexing; 2D, depth, graphics and graphics depth frame multiplexing.

In general, the transmission of 3D video data can be characterized by three parameters:
pixel repeat rate;
number of frames in a unit of frames of a single 3D image; and
the format used to multiplex the frames.

In a preferred embodiment of the invention, information regarding these three parameters is included in the 3D transfer information for each unit. For maximum flexibility, these may be transmitted in three separate fields, although other encoding schemes may be used.

In an embodiment of the invention, HDMI is used as interface, and the 3D transfer information is included in AVI info frames and/or HDMI Vendor Specific info frames. In an embodiment that allows for maximum flexibility, the 3D transfer information is sent in a separate info frame.

BRIEF DESCRIPTION OF THE DRAWINGS

These and other aspects of the invention will be apparent from and elucidated further with reference to the embodiments described by way of example in the following description and with reference to the accompanying drawings, in which.

In the Figures, elements which correspond to elements already described have the same reference numerals.

DETAILED DESCRIPTION OF EMBODIMENTS

Figure 1:
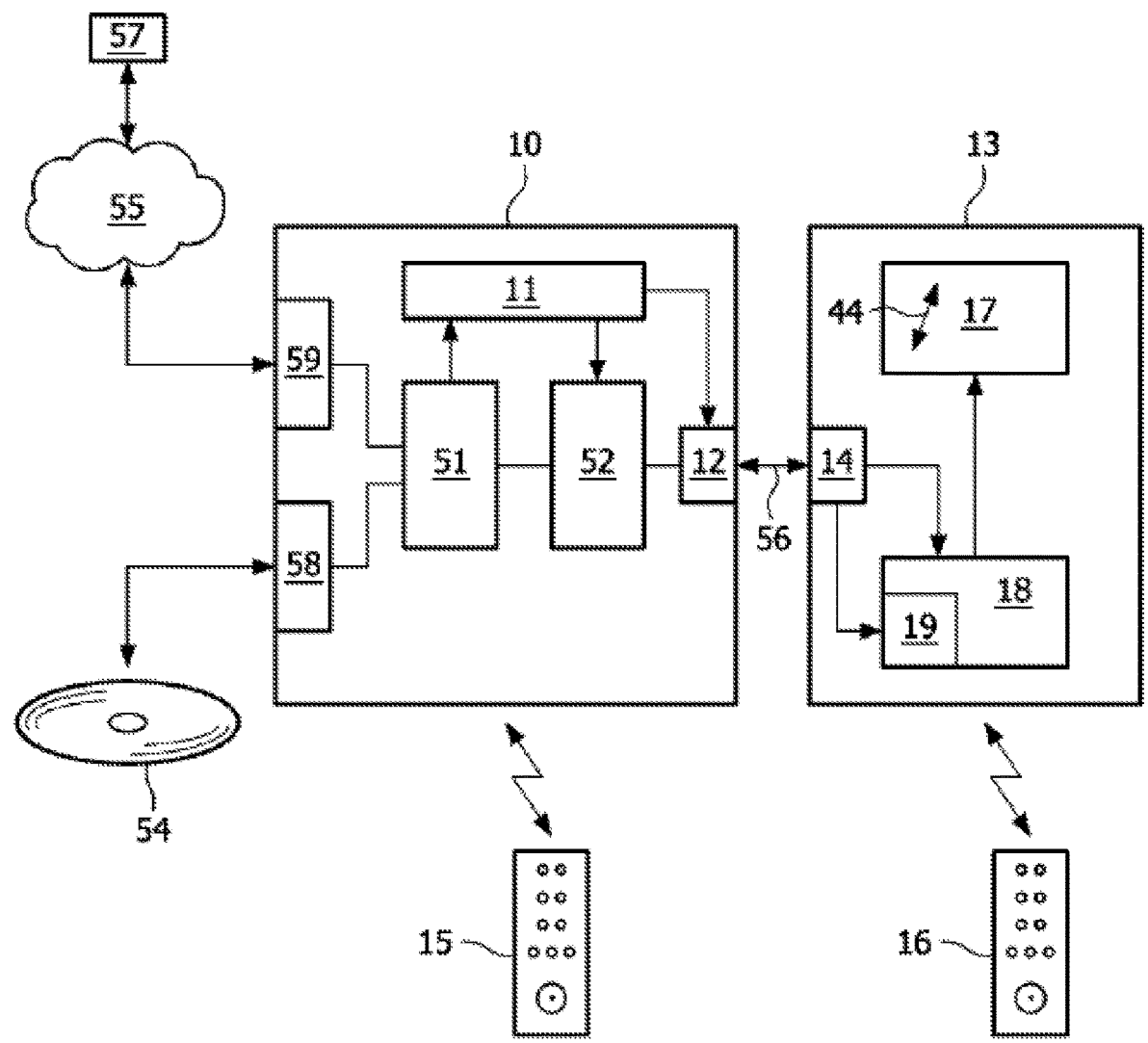
FIG. 1 shows a system for transferring three-dimensional (3D) image data.

FIG. 1 shows a system for transferring three-dimensional (3D) image data, such as video, graphics or other visual information. A 3D source device 10 is coupled to a 3D display device 13 for transferring a 3D display signal 56. The 3D source device has an input unit 51 for receiving image information. For example, the input unit 51 may include an optical disc unit 58 for retrieving various types of image information from an optical record carrier 54, such as a DVD or BluRay disc. Alternatively, the input unit 51 may include a network interface unit 59 for coupling to a network 55, for example the internet or a broadcast network, such device usually being called a set-top box. Image data may be retrieved from a remote media server 57. The source device 10 may also be a satellite receiver, or a media server directly providing the display signals, i.e. any suitable device that outputs a 3D display signal to be directly coupled to a display unit.

The 3D source device has a processing unit 52 coupled to the input unit 51 for processing the image information for generating the 3D display signal 56 to be transferred via an output interface unit 12 to the display device 13. The processing unit 52 includes a processor circuit that is arranged for generating the image data included in the 3D display signal 56 for display on the display device 13. The source device 10 is provided with user control elements 15, for controlling display parameters of the image data, such as contrast or color parameter. The user control elements as such are well known, and may include a remote-control unit having various buttons and/or cursor control functions to control the various functions of the 3D source device, such as playback and recording functions, and for setting the display parameters, e.g. via a graphical user interface and/or menus.

The source device has a transmit synchronization unit 11 for providing at least one frame type synchronization indicator in the 3D display signal, which indicator is included in the 3D display signal in the output interface unit 12. The output interface unit 12 is arranged for transferring the 3D display signal with the image data and the frame type synchronization indicators from the source device 10 to the display device 13 as the 3D display signal 56. The 3D display signal 56 comprises a sequence of frames, the frames organized in groups of frames that form a unit, thereby constituting the 3D image data according to a 3D video transfer format.

Each frame of a unit is of a given frame type that has a partial 3D data structure for representing a sequence of digital image pixel data, usually arranged as a sequence of horizontal lines of a number of pixels according to a predetermined resolution. For example, the 3D partial data structures in the frame types of the 3D video transfer format may be: left and right images, or a 2D image and additional depth, and/or further 3D data such as occlusion or transparency information, as discussed further below. Note that the frame type may also be a combination frame type indicative of a combination of sub-frames of the above frame types, e.g. 4 sub-frames having a lower resolution located in a single full resolution frame. Also, a number of multi-view images may be encoded in the video stream of frames to be simultaneously displayed.

The source device 10 is adapted to include 3D transfer information comprising at least information about the number of video frames in a unit to be composed into a single 3D image in the 3D display signal 56. This may be achieved by adding the corresponding functionality into the synchronization unit 11.

The 3D display device 13 displays 3D image data derived from the 3D display signal 56. The device 13 has an input interface unit 14 for receiving the 3D display signal 56, including the 3D image data in frames and the frame type synchronization indicators transferred from the source device 10. As detailed above, each frame has a partial 3D data structure for representing a sequence of digital image pixel databased on its frame type. The display device 13 is provided with further user control elements 16, for setting display parameters of the display, such as contrast, color or depth parameters.

The transferred image data is processed in processing unit, or processor circuit 18 according to the setting commands from the user control elements 16 and display control signals for rendering the 3D image data on the 3D display based on the particular frame type of each unit. The device has a 3D display 17, such as a dual LCD, that receives the display control signals for displaying the processed image data. The 3D display 17 is a stereoscopic display having a display depth range indicated by arrow 44. The display of 3D image data is performed based on the different frames in each unit, each frame providing a respective partial 3D image data structure.

The display device 13 further includes a detection unit 19 coupled to the processing unit 18 for retrieving the frame type synchronization indicator from the 3D display signal 56, and for detecting the particular frame type in each unit in the received 3D display signal 56, as well as the particular number of frames comprising the unit. The processing unit 18 is arranged for generating the display control signals based on the particular types of image data as defined by the partial 3D data structures of the respective 3D video format, e.g. a 2D image frame and a depth frame. The respective frames of each unit are recognized and synchronized in time based on the respective frame type synchronization indicators.

The display device is adapted to detect the 3D transfer information, which comprises at least information about the number of video frames in a unit to be composed into a single 3D image in the 3D display signal; and to use the 3D transfer information to generate the display control signals in dependence on the 3D transfer information. This can be achieved, for example, by adapting the detection unit 19 to detect the 3D transfer information, and by adapting the processing means 18 to read the given number of frames comprising the unit, and to generate the display control signals in dependence on the 3D transfer information.

The frame type synchronization indicators allow determining the number of frames that must be combined to be displayed at the same time, and also indicate the frame type, so that the respective partial 3D data of each frame can be retrieved and processed.

The 3D display signal 56 may be transferred over a suitable high speed digital video interface such as the well-known HDMI interface (e.g. see "High Definition Multimedia Interface Specification Version 1.3a of 10 Nov. 2006).

FIG. 1 further shows the record carrier 54 as a carrier of the 3D image data. The record carrier is disc-shaped and has a track and a central hole. The track, constituted by a series of physically detectable marks, is arranged in accordance with a spiral or concentric pattern of turns constituting substantially parallel tracks on an information layer. The record carrier may be optically readable, called an optical disc, e.g. a CD, DVD or BD (Blue-ray Disc). The information is represented on the information layer by the optically detectable marks along the track, e.g. pits and lands. The track structure also comprises position information, e.g. headers and addresses, for indication the location of units of information, usually called information blocks. The record carrier 54 carries information representing digitally encoded image data like video, for example encoded according to the MPEG2 or MPEG4 encoding system, in a predefined recording format like the DVD or BD format.

It is noted that a player may support playing various formats, but not be able to transcode the video formats, and a display device may be capable of playing a limited set of video formats. Note that, depending the disc or the content, the format may change during playback/operation of the system. Real-time synchronization of format needs to take place for each unit, and, in embodiments of this invention, real-time switching of formats is provided by the frame type synchronization indicator of each unit.

The following section provides an overview of three-dimensional displays and perception of depth by humans. 3D displays differ from 2D displays in the sense that they can provide a more vivid perception of depth. This is achieved because they provide more depth cues then 2D displays which can only show monocular depth cues and cues based on motion.

Monocular (or static) depth cues can be obtained from a static image using a single eye. Painters often use monocular cues to create a sense of depth in their paintings. These cues include relative size, height relative to the horizon, occlusion, perspective, texture gradients, and lighting/shadows. Oculomotor cues are depth cues derived from tension in the muscles of a viewer's eyes. The eyes have muscles for rotating the eyes as well as for stretching the eye lens. The stretching and relaxing of the eye lens is called accommodation and is done when focusing on an image. The amount of stretching or relaxing of the lens muscles provides a cue for how far or close an object is. Rotation of the eyes is done such that both eyes focus on the same object, which is called convergence. Finally, motion parallax is the effect that objects close to a viewer appear to move faster than objects further away.

Binocular disparity is a depth cue which is derived from the fact that both our eyes see a slightly different image. Monocular depth cues can be and are used in any 2D visual display type. To re-create binocular disparity in a display requires that the display can segment the view for the left and right eye such that each sees a slightly different image on the display. Displays that can re-create binocular disparity are special displays which we will refer to as 3D or stereoscopic displays. The 3D displays are able to display images along a depth dimension actually perceived by the human eyes. Hence 3D displays provide a different view to the left and right eye. 3D displays that can provide two different views have been around for a long time. Most of these were based on using glasses to separate the left and right eye view. Now, with the advancement of display technology, new displays have entered the market that can provide a stereo view without using glasses. These displays are called auto-stereoscopic displays.

A first approach is based on LCD displays that allow the user to see stereo video without glasses. These are based on either of two techniques, the lenticular screen and the barrier displays. With the lenticular display, the LCD is covered by a sheet of lenticular lenses. These lenses diffract the light from the display such that the left and right eye receive light from different pixels. This allows two different images one for the left and one for the right eye view to be displayed.

An alternative to the lenticular screen is the Barrier display, which uses a parallax barrier behind the LCD and in front the backlight to separate the light from pixels in the LCD. The barrier is such that from a set position in front of the screen, the left eye sees different pixels then the right eye. The barrier may also be between the LCD and the human viewer so that pixels in a row of the display alternately are visible by the left and right eye. A problem with the barrier display is loss in brightness and resolution, and also a very narrow viewing angle. This makes it less attractive as a living room TV compared to the lenticular screen, which, for example may have as many as nine views and multiple viewing zones.

A further approach is still based on using shutter-glasses in combination with high-resolution beamers that can display frames at a high refresh rate (e.g. 120 Hz). The high refresh rate is required because with the shutter glasses method the left and right eye view are alternately displayed. For the viewer wearing the glasses perceives stereo video at 60 Hz. The shutter-glasses method allows for a high-quality video and great level of depth.

The auto stereoscopic displays and the shutter glasses method both suffer from accommodation-convergence mismatch. This does limit the amount of depth and the time that can be comfortable viewed using these devices. There are other display technologies, such as holographic and volumetric displays, which do not suffer from this problem. It is noted that the current invention may be used for any type of 3D display that has a depth range.

Image data for the 3D displays is assumed to be available as electronic, usually digital, data. The current invention relates to such image data and manipulates the image data in the digital domain. The image data, when transferred from a source, may already contain 3D information, e.g. by using dual cameras, or a dedicated preprocessing system may be involved to (re-)create the 3D information from 2D images. Image data may be static, such as slides, or may include moving video, such as movies. Other image data, usually called graphical data, may be available as stored objects or generated on the fly as required by an application. For example, user control information, such as menus, navigation items, or text and help annotations may be added to other image data.

There are many different ways in which stereo images may be formatted, herein termed 3D image formats. Some formats are based on using a 2D channel to also carry the stereo information. For example, the left and right view can be interlaced, or can be placed side by side, or above and under. These methods sacrifice resolution to carry the stereo information. Another option is to sacrifice color, this approach is called anaglyphic stereo. Anaglyphic stereo uses spectral multiplexing which is based on displaying two separate, overlaid images in complementary colors. By using glasses with colored filters, each eye only sees the image of the same color as of the filter in front of that eye. So, for example, the right eye only sees the red image and the left eye only the green image.

A different 3D format is based on two views using a 2D image and an additional depth image, also known as a depth map, which conveys information about the depth of objects in the 2D image. The format called image+depth is different from the aforementioned formats in that it is a combination of a 2D image with a so called "depth", or disparity map. The disparity map is commonly formatted as a gray scale image, whereby the gray scale value of a pixel indicates the amount of disparity (or depth in case of a depth map) for the corresponding pixel in the associated 2D image. The display device uses the disparity, depth, or parallax map to calculate additional views using the 2D image as input. This may be done in a variety of ways; in the simplest form, it is a matter of shifting pixels to the left or right depending on the disparity value associated with those pixels. The paper entitled "Depth image based rendering, compression and transmission for a new approach on 3D TV" by Christoph Fen gives an excellent overview of the technology (see iphome.hhi.de/fehn/Publications/fehn_EI2004.pdf), which is incorporated by reference.

Figure 2:
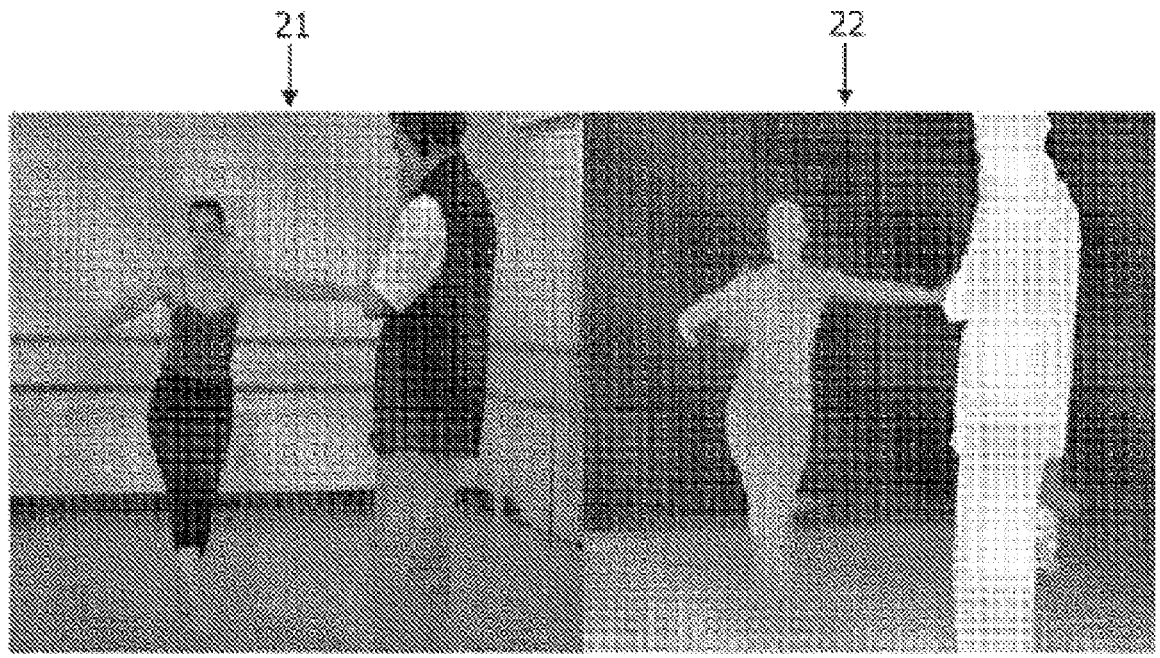
FIG. 2 shows an example of 3D image data.

FIG. 2 shows an example of 3D image data. The left part of the image data is a 2D image 21, usually in color, and the right part of the image data is a depth map 22. The 2D image information may be represented in any suitable image format. The depth map information may be an additional data stream having a depth value for each pixel, possibly at a reduced resolution compared to the 2D image. In the depth map, grey scale values indicate the depth of the associated pixel in the 2D image. White indicates close to the viewer, and black indicates a large depth far from the viewer. A 3D display can calculate the additional view required for stereo by using the depth value from the depth map and by calculating required pixel transformations. Occlusions may be solved using estimation or hole filling techniques. Additional frames may be included in the data stream, e.g. further added to the image and depth map format, like an occlusion map, a parallax map and/or a transparency map for transparent objects moving in front of a background.

Adding stereo to video also impacts the format of the video when it is sent from a source device, such as a Blu-ray disc player, to a stereo display. In the 2D case, only a 2D video stream is sent (decoded picture data). With stereo video, the volume of data increases, as now a second stream must be sent containing the second view (for stereo) or a depth map. This could double the required bitrate on the electrical interface. A different approach is to sacrifice resolution and format the stream such that the second view or the depth map are interlaced or placed side by side with the 2D video. In multiview 3D, more than two streams must be sent containing the other views.

FIG. 2 shows an example of 2D data and a depth map. The depth display parameters that are sent to the display to allow the display to correctly interpret the depth information. Examples of including additional information in video are described in the ISO standard 23002-3 "Representation of auxiliary video and supplemental information" (e.g. see ISO/IEC JTC1/SC29/WG11 N8259 of July 2007). Depending on the type of auxiliary stream the additional image data consists either of two or four parameters. The frame type synchronization indicator may comprise a 3D video format indicator that is indicative of the respective 3D video transfer format in a subsequent section of the 3D display signal. This enables changing the 3D video transfer format, or to reset the transfer sequence, or to set or reset further synchronization parameters.

In an embodiment, the frame type synchronization indicator includes a frame sequence indicator indicative of a frequency of at least one frame type. Note that some frame types allow a lower frequency of transmission without substantial deterioration of the perceived 3D image, for example, occlusion data. Furthermore, an order of the different frame types may be indicated as a sequence of different frames types to be repeated.

In an embodiment, the frame type synchronization indicator and the 3D transfer information includes a frame sequence number. Individual frames may also be provided with the frame sequence number. The sequence number is incremented regularly, e.g. when all frames constituting a single 3D image have been sent and the following frames belong to a next 3D image. Hence, the number is different for every synchronization cycle, or may change only for a larger section. Hence, when a jump is performed, the set of frames having the same respective sequence number must be transferred before the image display can be resumed. The display device will detect the deviating frame sequence number and will only combine a complete set of frames. This prevents that, after a jump to a new location, an erroneous combination of frames is used.

When adding graphics on video, further separate data streams may be used to overlay the additional layers in the display unit. Such layer data is included in different frame types, which are separately marked by adding respective frame type synchronization indicators in the 3D display signal as discussed in detail below. The 3D video transfer format now comprises a main video and at least one additional video layer transferred via respective frame types and the frame type synchronization indicator comprises at least one of a main frame type indicator and an additional layer frame type indicator. The additional video layer may, for example, be subtitles or other graphical information like a menu or any other on screen data (OSD).

A possible format for the units of frames will be described with reference to FIGS. 4 to 7. This format has also been described in EP application no 09150947.1 from which priority is claimed and which is included herein by reference.

The received compressed stream comprises 3D information that allows compositing and rendering on both stereoscopic and auto stereoscopic display, i.e. the compressed stream comprises a left and a right video frame, and depth (D), transparency (T) and occlusion (O) information for allowing rendering based on 2D+depth information. In the following depth (D), transparency (T) and occlusion (O) information will be shorthanded named as DOT.

The presence of both Stereo and DOT as compressed streams allows compositing and rendering that is optimized by the display, depending on the type and size of display, while compositing is still controlled by the content author.

The following components may be transmitted over the display interface:
Decoded video data (not mixed with PG and IG/BD-J)
presentation graphics (PG) data
Interactive graphics (IG) or BD-Java generated (BD-J) Graphics data
Decoded Video DOT
presentation graphics (PG) DOT
Interactive graphics (IG) or BD-Java generated (BD-J) Graphics.

Figure 4:
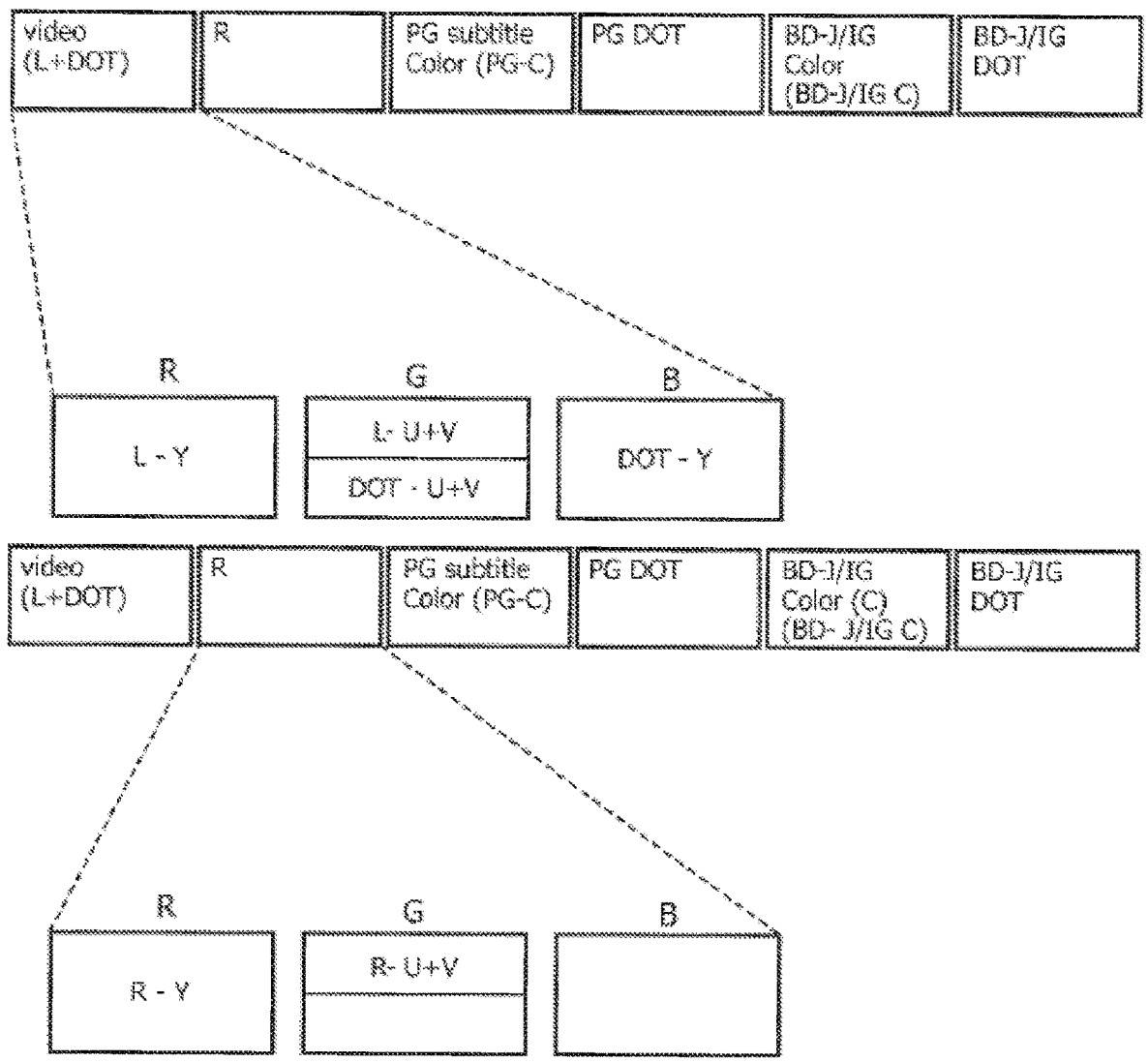
FIG. 4 shows schematically possible units of frames to be sent over the video interface for a 3D image data corresponding 2D+Stereo+DOT.
Figure 5:
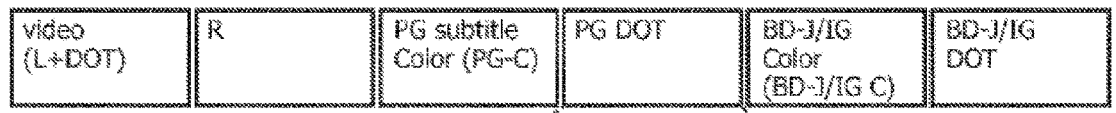
FIG. 5 shows schematically further details of possible units of frames to be sent over the video interface for a 3D image data corresponding 2D+Stereo+DOT.
Figure 5:
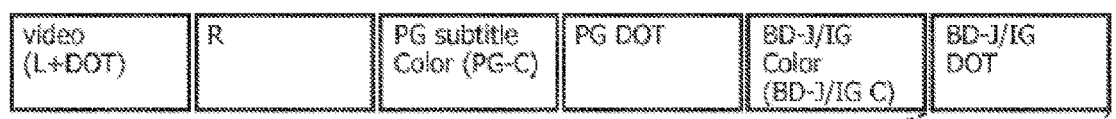

FIGS. 4 and 5 show schematically units of frames to be sent over the video interface.

The Output stage sends over the interface (Preferably HDMI) units of 6 frames organized as follows:
Frame 1: The YUV components of the Left (L) video and DOT video are combined in one 24 Hz RGB output frame; YUV designates, in the field of video processing, the standard luminance (Y) and chroma (UV) components.
Frame 2: The Right (R) video is sent unmodified out, preferably at 24 Hz.
Frame 3: The PC color (PG-C) is sent unmodified out, as RGB components, preferably at 24 Hz.
Frame 4: The transparency of the PG-Color is copied into a separate graphics DOT output plane and combined with the depth and the 960×540 occlusion and occlusion depth (OD) components for various planes.
Frame 5: The BD-J/IG color (C) is sent unmodified out, preferably at 24 Hz.
Frame 6: The transparency of the BD-J/IG Color is copied into a separate graphics DOT output plane and combined with the depth and the 960×540 occlusion and occlusion depth (OD) components.

Figure 6:
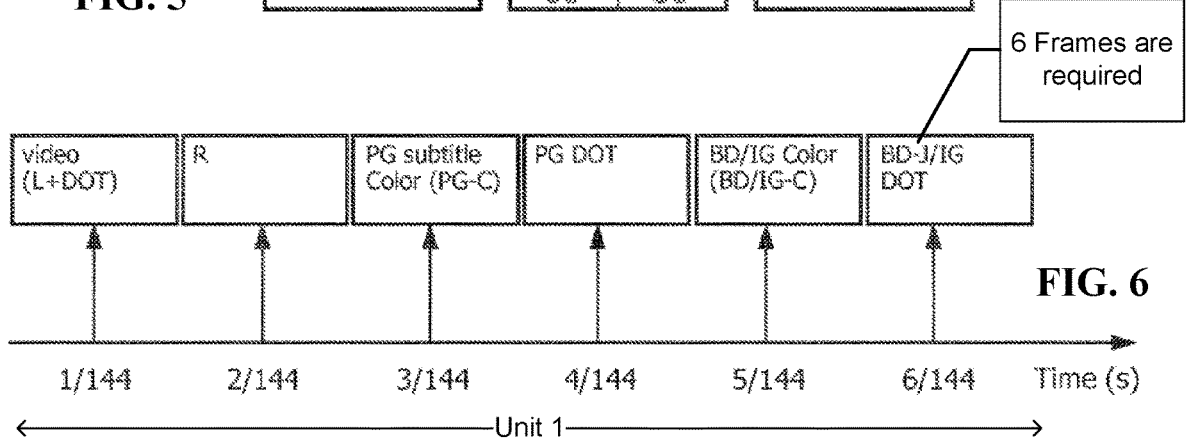
FIG. 6 shows schematically the time output of frames over the video interface, for a 3D image data corresponding 2D+Stereo+DOT.
Figure 7:
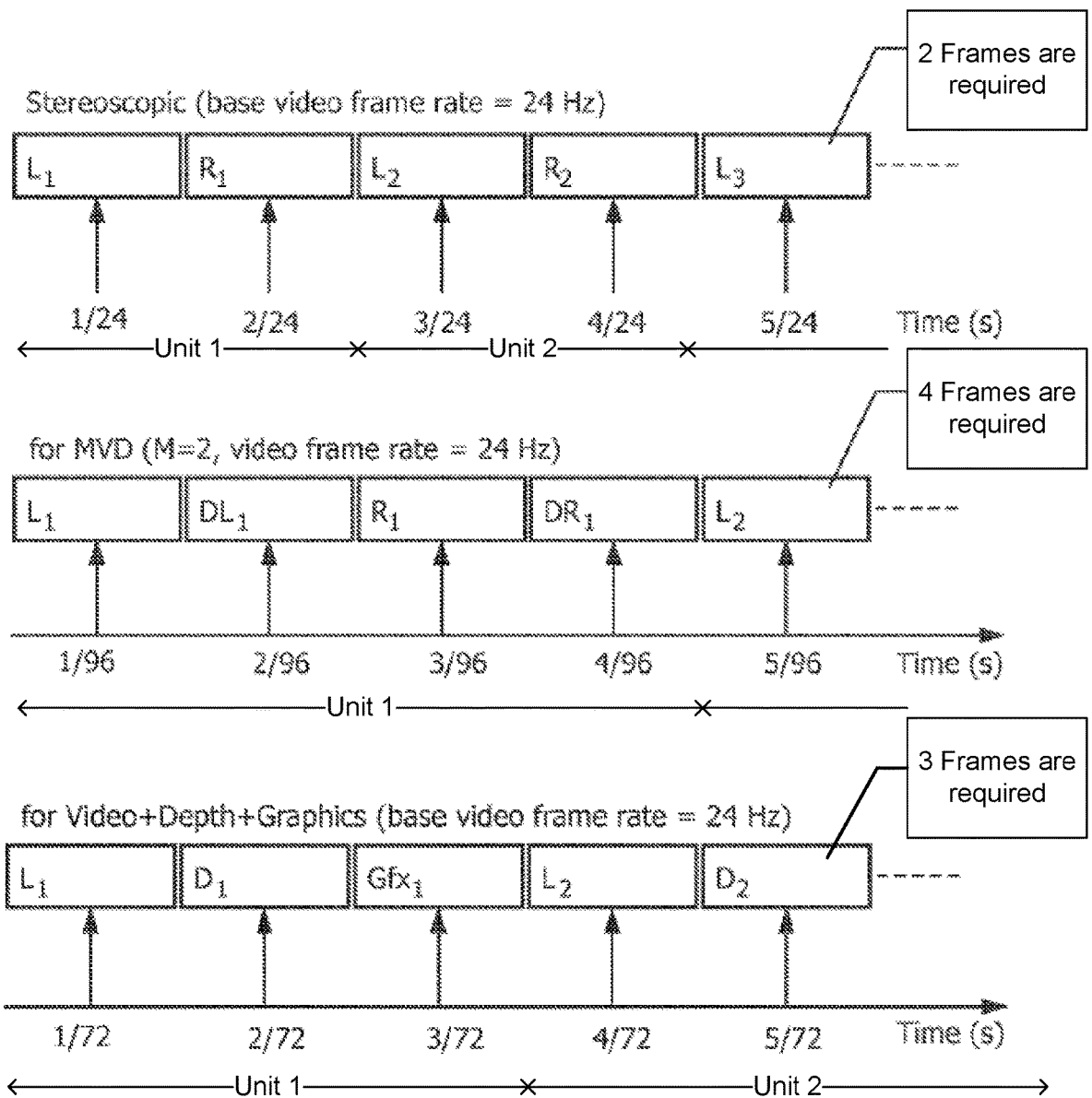
FIG. 7 shows schematically possible units of frames arrangement for a stereo signal.

FIG. 6 shows schematically the time output of frames over the video interface, according to the preferred embodiment of the invention. Herein the components are sent at 24 Hz components interleaved in time over the HDMI interface at an interface frequency of 144 Hz to the display.

Advantages of this 3D video format:

The full resolution flexible 3D stereo+DOT format and 3D HDMI output allows enhanced 3D video (variable baseline for display size dependency) and enhanced 3D graphics (less graphics restrictions, 3D TV OSD) possibilities for various 3D displays (stereo and autostereoscopic).

No compromises to quality, authoring flexibility and with minimal cost to player hardware. Compositing and rendering is done in the 3D display.

The required higher video interface speed is being defined in HDMI for 4k2k formats and can already be implemented with dual-link HDMI. Dual link HDMI also supports higher frame rates such as 30 Hz etc.

The 3D transfer information indicator may comprise, for the additional video layer, layer signaling parameters. The parameters may be indicative of at least one of type and/or format of additional layer;

location of display of the additional layer with respect to display of the main video;

size of display of the additional layer;

time of appearance, disappearance and or duration of display of the additional layer;

additional 3D display settings or 3D display parameters.

Further detailed examples are discussed below.

Figure 3:
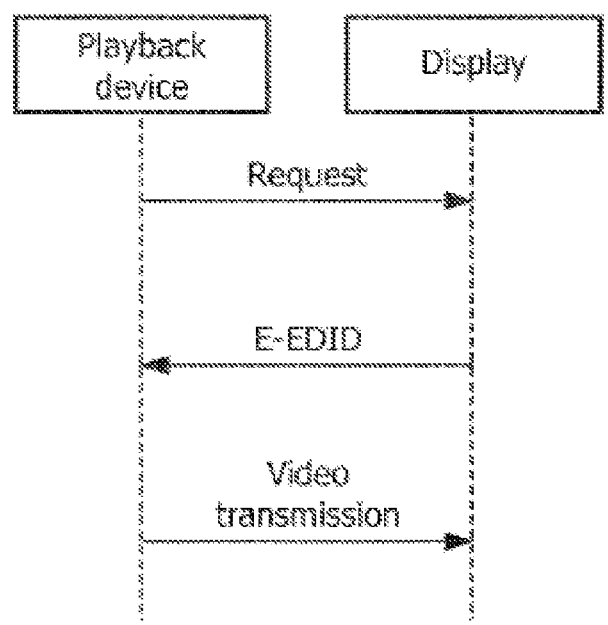
FIG. 3 shows playback device and display device combination.

FIG. 3 shows playback device and display device combination. The player 10 reads the capabilities of the display 13 and adjusts the format and timing parameters of the video to send the highest resolution video, spatially as well as temporal, that the display can handle. In practice, a standard is used, such as extended display identification data (EDID). EDID is a data structure provided by a display device to describe its capabilities to an image source, e.g. a graphics card. It enables a source device to know what kind of monitor is connected. EDID is defined by a standard published by the Video Electronics Standards Association (VESA). Further refer to VESA DisplayPort Standard Version 1, Revision 1a, Jan. 11, 2008 available via http://www.vesa.org/.

The EDID includes manufacturer name, product type, phosphor or filter type, timings supported by the display, display size, luminance data and (for digital displays only) pixel mapping data. The channel for transmitting the EDID from the display to the graphics card is usually an $I^2C$ bus. The combination of EDID and $I^2C$ is called the Display Data Channel version 2, or DDC2. The 2 distinguishes it from VESA's original DDC, which used a different serial format. The EDID is often stored in the monitor in a memory device, such as a serial PROM (programmable read-only memory) or EEPROM (electrically erasable PROM). An Enhanced EDID (E-EDID) has been introduced, and is currently commonly used.

The playback device sends an E-EDID request to the display over the DDC2 channel. The display responds by sending the E-EDID information. The player determines the best format and starts transmitting over the video channel. In older types of displays the display continuously sends the E-EDID information on the DDC channel. No request is send. To further define the video format in use on the interface a further organization (Consumer Electronics Association; CEA) defined several additional restrictions and extensions to E-EDID to make it more suitable for use with TV type of displays. The HDMI standard (referenced above) in addition to specific E-EDID requirements supports identification codes and related timing information for many different video formats. For example, the CEA 861-D standard is adopted in the interface standard HDMI. HDMI defines the physical link and it supports the CEA 861-D and VESA E-EDID standards to handle the higher level signaling. The VESA E-EDID standard allows the display to indicate whether it supports stereoscopic video transmission and in what format. It is to be noted that such information about the capabilities of the display travels backwards to the source device. The known VESA standards do not define any forward 3D information that controls 3D processing in the display.

In an embodiment, the 3D transfer information in the 3D display signal is transferred asynchronously, e.g. as a separate packet in a data stream while identifying the respective frame to which it relates. The packet may include further data for accurately synchronizing with the video, and may be inserted at an appropriate time in the blanking intervals between successive video frames. In a practical embodiment, 3D transfer information is inserted in packets within the HDMI Data Islands.

An example of including the 3D transfer information in Auxiliary Video Information (AVI) as defined in HDMI in an audio video data (AV) stream is as follows. The AVI is carried in the AV-stream from the source device to a digital television (DTV) Monitor as an Info Frame. If the source device supports the transmission of the Auxiliary Video Information (AVI) and if it determines that the DTV Monitor is capable of receiving that information, it shall send the AVI to the DTV Monitor once per VSYNC period. The data applies to the next full frame of video data.

In the following section, a short description of HMDI signaling will be presented. In HDMI, a device with an HDMI output is known as a source, while a device with an HDMI input is known as sink. An InfoFrame is a data structure defined in CEA-861-D that is designed to carry a variety of auxiliary data items regarding the audio or video streams or the source device and is carried from Source to Sink across HDMI. A Video Field is the period from one VSYNC active edge to the next VSYNC active edge. A video format is sufficiently defined such that when it is received at the monitor, the monitor has enough information to properly display the video to the user. The definition of each format includes a Video Format Timing, the picture aspect ratio, and a colorimetric space. Video Format Timing corresponds to a waveform associated with a video format. Note that a specific Video Format Timing may be associated with more than one Video Format (e.g., 720×480p@4:3 and 720×480p@16:9).

HDMI includes three separate communications channels: TMDS, DDC, and the optional CEC. TMDS is used to carry all audio and video data as well as auxiliary data, including AVI and Audio InfoFrames that describe the active audio and video streams. The DDC channel is used by an HDMI Source to determine the capabilities and characteristics of the Sink by reading the E-EDID data structure.

HDMI Sources are expected to read the Sink's E-EDID and to deliver only the audio and video formats that are supported by the Sink. In addition, HDMI Sinks are expected to detect InfoFrames and to process the received audio and video data appropriately.

The CEC channel is optionally used for higher-level user functions such as automatic setup tasks or tasks typically associated with infrared remote control usage.

An HDMI link operates in one of three modes: Video Data Period, Data Island period, and Control period. During the Video Data Period, the active pixels of an active video line are transmitted. During the Data Island period, audio and auxiliary data are transmitted using a series of packets. The Control period is used when no video, audio, or auxiliary data needs to be transmitted. A Control Period is required between any two periods that are not Control Periods.

TABLE 1 illustrated packet types in a HDMI data Island

| Packet Type Value | Packet Type |
|---|---|
| 0x00 | Null |
| 0x01 | Audio Clock Regeneration (N/CTS) |
| 0x02 | Audio Sample (L-PCM and IEC 61937 compressed formats) |
| 0x03 | General Control |
| 0x04 | ACP Packet |
| 0x05 | ISRC1 Packet |
| 0x06 | ISRC2 Packet |
| 0x07 | One Bit Audio Sample Packet |
| 0x08 | DST Audio Packet |
| 0x09 | High Bitrate (HBR) Audio Stream Packet (IEC 61937) |
| 0x0A | Gamut Metadata Packet |
| 0x80 + InfoFrameType | InfoFrame Packet |
| 0x81 | Vendor-Specific InfoFrame |
| 0x82 | AVI InfoFrame* |
| 0x83 | Source Product Descriptor InfoFrame |
| 0x84 | Audio InfoFrame |
| 0x85 | MPEG Source InfoFrame |

It was identified by the inventors that the present Infoframe Packet, AVI info frame etc. are not suitable for handling transmission of 3D video data In general, the transmission of 3D video data can be characterized by 3 parameters:
  VIC (pixel repeat rate) from table 8.7 in the HDMI spec
    e.g. 1920×1080p@60 Hz
  number of frames in a unit of frames of a single 3D image
  N=1 for monoscopic
  N=2 for stereo and video+depth
  N=3 for video+depth+graphics
  N=4 for MVD @ M=2, etc
  N=6 for the unit defined with reference to FIGS. 4 to 6
  the format: way of multiplexing the channels
    frame alternating
    field alternating
    line alternating
    side by side
    checker board, etc.

Figure 8:
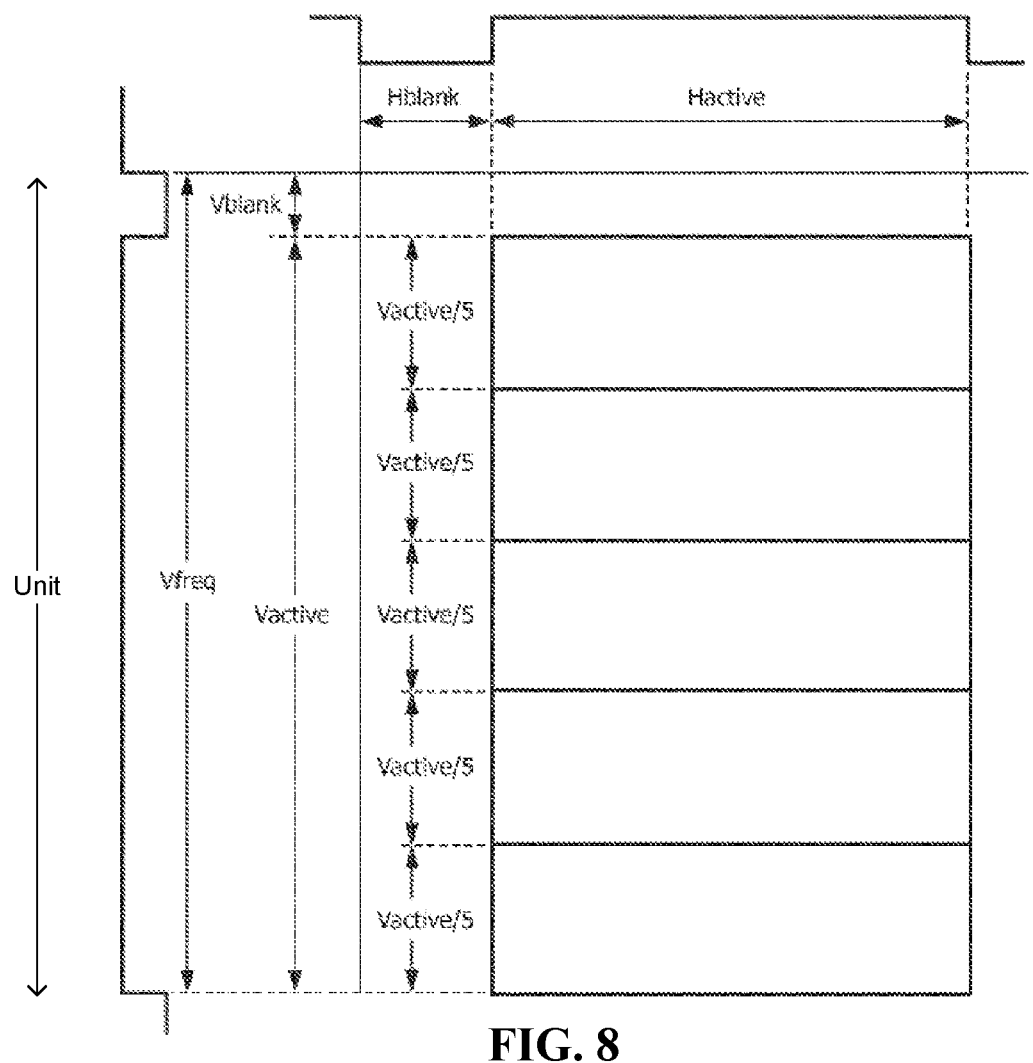
FIG. 8 shows horizontal and vertical blanking and signaling for a 3D+DOT format @1920 pixels.

FIG. 8 shows horizontal and vertical blanking and signaling for a 3D+DOT format @1920 pixels. The Figure shows a multiplexing scheme of frame alternating multiplexing. In the example 5 frames indicated by Vactive/5 constitute the 3D image of the 3D+DOT format, which frames are sequentially arranged in the unit between the vertical synchronization pulses VSYNC of the 3D signal, indicated by Vfreq. The vertical synchronization pulses indicate the video data period Vactive starting after the vertical blanking Vblank, in which period the frames are sequentially arranged. Similarly, the horizontal blanking pulses HSYNC indicate the line period Hactive starting after the horizontal blanking Hblank. Hence the frame alternating multiplexing scheme indicates the number of frames being sequentially arranged within the video data period.

Figure 9:
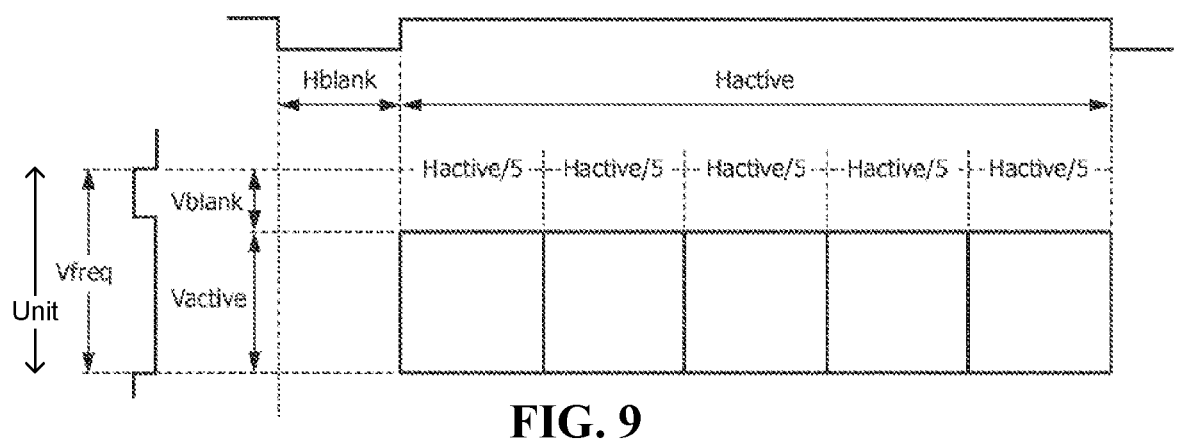
FIG. 9 shows horizontal and vertical blanking and signaling for a 3D+DOT format @720 pixels sent as 1920 progressive @30 Hz.

FIG. 9 shows horizontal and vertical blanking and signaling for a 3D+DOT format 720 pixels sent as 1920 progressive @30 Hz. The Figure shows a multiplexing scheme of side by side frame multiplexing. In the example 5 frames indicated by Hactive/5 constitute the 3D image of the 3D+DOT format, which frames are side by side arranged in the unit between the vertical synchronization pulses VSYNC of the 3D signal, indicated by Vfreq. The vertical synchronization pulses indicate the video data period Vactive starting after the vertical blanking Vblank, in which period the frames are arranged side by side. Similarly, the horizontal blanking pulses HSYNC indicate the line period Hactive starting after the horizontal blanking Hblank. Hence the side by side frame multiplexing scheme indicates the number of frames being sequentially arranged within the video data period.

For maximum flexibility, according to the invention, the above parameters of the multiplexing scheme should be transmitted in three separate fields.

In an embodiment of the invention, these are sent over in AVI info frames and/or HDMI Vendor Specific InfoFrames.

In the following detailed embodiment in the case of HDMI interfaces will be presented.

Table 2 described the relevant byte of the InfoFrame packet according to a preferred embodiment of the invention.

Therein, HDMI_VIC0 . . . HDMI_VIC7 describe the Video Format Identification Code. When transmitting any video format defined in this section, an HDMI Source shall set the HDMI_VIC field to the Video Code for that format.

Therein, HDMI_3D_FMT0 . . . HDMI_3D_FMT7 describe 3D Format Code. When transmitting any video format defined in this section, an HDMI Source shall set the HDMI_3D_FMT field to the Video Code for that format.

TABLE 2

| Packet Byte # | 7 | 6 | 5 | 4 | 3 | 2 | 1 | 0 |
|---|---|---|---|---|---|---|---|---|
| PB0 | 24bit IEEE Registration Identifier ((0x000C03)) | | | | | | | |
| PB1 | (Least Significant Byte first) | | | | | | | |
| PB2 | | | | | | | | |
| PB3 | HDMI_VIC7 | HDMI_VIC6 | HDMI_VIC5 | HDMI_VIC4 | HDMI_VIC3 | HDMI_VIC2 | HDMI_VIC1 | HDMI_VIC0 |
| PB4 | HDMI_3D_FMT7 | HDMI_3D_FMT6 | HDMI_3D_FMT5 | HDMI_3D_FMT4 | HDMI_3D_FMT3 | HDMI_3D_FMT2 | HDMI_3D_FMT1 | HDMI_3D_FMT0 |
| PB5~ | Reserved (0) | | | | | | | |

According to the invention, additional video timing format values, which are identified by HDMI_VIC numbers and/or HDMI 3D_FMT, are defined for 3D (stereoscopic) transmission.

As noted above, the transmission of 3D video data can generally be characterized by three parameters:

pixel repeat rate;

number of frames in a unit of frames of a single 3D image; and the format used to multiplex the frames.

In a preferred embodiment of the invention, information regarding these three parameters is included in the 3D transfer information (HDMI_VIC and/or HDMI_3D_FMT) for each unit. For maximum flexibility, these may be transmitted in three separate fields, but this would not be consistent with the use of the two conventional HDMI_VIC and/or HDMI_3D_FMT fields.

In an example embodiment, sub-fields of the HDMI_VIC and/or HDMI_3D_FMT fields may be used to contain the three parameters. For example, depending upon the expected number of pixel repeat rate combinations, N bits of the HDMI_VIC field could be reserved for encoding the pixel rate, and the remaining 8-N bits could be used for encoding the number of frames in a unit; in like manner, M bits of the HDMI 3D_FMT field could be used for encoding the multiplex format, and the remaining 8-M bits could be used for encoding the number of frames in a unit. Similarly, N bits could be used for encoding the pixel rate, M bits could be used for encoding the multiplex format, and the remaining 16-(M+N) bits could be used for encoding the number of frames in a unit.

In an alternative embodiment, consistent with conventional HDMI practices, a specific HDMI_VIC code may be indexed to a reference table that explicitly contains the details associated with the pixel repeat rate combinations, such as the number of pixels in each of the horizontal and vertical direction and the video frequency frame rate. As illustrated in table 3, below, the HDMI_VIC codes may be extended to include the number of frames per unit, as well as the pixel rate information.

TABLE 3

HDMI_VIC for 3D transmission

| HDMI_VIC | Hactive | Vactive | (Hz) V freq | # of frames | Description |
| --- | --- | --- | --- | --- | --- |
| 1 | 1920 | 1080 | 60 | 1 | 1080i FullHD 60 Hz |
| 2 | 1920 | 1080 | 50 | 1 | 1080i FullHD 50 Hz |
| 3 | 1920 | 1080 | 60 | 1 | 1080p FullHD 60 Hz |
| 4 | 1920 | 1080 | 50 | 1 | 1080p FullHD 50 Hz |
| 5 | 1920 | 1080 | 24 | 1 | 1080p FullHD 24 Hz |
| 6 | 1920 | 1080 | 60 | 2 | 1080i FullHD 60 Hz |
| 7 | 1920 | 1080 | 50 | 2 | 1080i FullHD 50 Hz |
| 8 | 1920 | 1080 | 60 | 2 | 1080p FullHD 60 Hz |
| 9 | 1920 | 1080 | 50 | 2 | 1080p FullHD 50 Hz |
| 10 | 1920 | 1080 | 24 | 2 | 1080p FullHD 24 Hz |
| 11 | 1920 | 1080 | 60 | 3 | 1080i FullHD 60 Hz |
| etc. | etc. | etc. | etc. | etc. | etc. |

That is, for example, HDMI_VIC codes 1-5 indicate that the number of frames in the next unit is one; codes 6-10 indicate that the number of frames in the next unit is two; and so on.

According to this aspect of the invention, the format of multiplexing of 3D channels is identified by HDMI 3D_FMT numbers, an example of which are defined in table 4.

TABLE 4

HDMI_3D_FMT for 3D Transmission

| HDMI_3D_FMT code | Description |
| --- | --- |
| 1 | Frame alternating |
| 2 | Field alternating |
| 3 | Line alternating |
| 4 | Side by Side |
| 5 | 2D + D |
| 6 | 2D + D + gfx1 |
| 7 | L + DL + R + DR |

One of skill in the art will recognize that instead of associating the number of frames per unit with each specific HDMI_VIC code, the conventional HDMI_VIC code may be used, and the HDMI_3D_FMT number may be used to identify the number of frames in units having this HDMI_3D_FMT number.

It is to be noted that the invention may be implemented in hardware and/or software, using programmable components. A method for implementing the invention has the processing steps corresponding to the transferring of 3D image data elucidated with reference to FIG. 1. Although the invention has been mainly explained by embodiments using optical record carriers or the internet, the invention is also suitable for any image interfacing environment, like a 3D personal computer (PC) display interface, or 3D media center PC coupled to a wireless 3D display device.

The invention can be summarized as follows: A system of transferring of three-dimensional (3D) image data is described. A 3D source device provides 3D display signal for a display via a high speed digital interface, such as HDMI. The 3D display signal comprises a sequence of frames constituting the 3D image data according to a 3D video transfer format. The sequence of frames comprises units, each unit corresponding frames comprising video information intended to be composited and displayed as a 3D image; each frame has a data structure for representing a sequence of digital image pixel data, and represents a partial 3D data structure. The 3D source device includes 3D transfer information comprising at least information about the number of video frames in a unit to be composed into a single 3D image in the 3D display signal. The display detects the 3D transfer information, and generates the display control signals based in dependence on the 3D transfer information. The 3D transfer information preferably further comprises information about the multiplexing scheme for multiplexing frames into the 3D display signal and most preferably comprises information over a pixel size and a frequency rate for frames. The 3D transfer information may be encoded in the HDMI_VIC and HDMI 3D_FMT fields of the HDMI Specification.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and lies in each and every novel feature or combination of features described above.

The invention claimed is:

1. A source device for transferring three-dimensional image data to a three-dimensional display device, comprising:
an input circuit that receives the three-dimensional image data;
a processor circuit that:
generates a three-dimensional display signal that comprises a sequence of frames corresponding to the three-dimensional image data in a three-dimensional video transfer format;
wherein the sequence of frames comprises units, each unit corresponding to a number of frames arranged according to a multiplexing scheme for composing video information that forms each three-dimensional image that is to be displayed on the three-dimensional display device;
wherein the three-dimensional video transfer format comprises a video data period during which pixels of video data are transmitted and a data island period during which auxiliary data is transmitted;
wherein the auxiliary data includes three-dimensional transfer information comprising at least information about the multiplexing scheme, including the number of frames in a next unit in the sequence of frames, thereby enabling the three-dimensional display device to determine the number of frames in the next unit and correspondingly form a next three-dimensional image for display on a three-dimensional display; and
an output circuit that provides the three-dimensional display signal for use by the three-dimensional display device.

2. The source device of claim 1, wherein the auxiliary data is transmitted via packets, and the three-dimensional transfer information is included in one or more information frame packets.

3. The source device of claim 2, wherein the auxiliary data conforms to a High Definition Multimedia Interface (HDMI) standard.

4. The source device of claim 3, wherein the auxiliary data is included in Auxiliary Video Information (AVI) of the High Definition Multimedia Interface, which is transmitted once per unit.

5. The source device of claim 4, wherein the three-dimensional transfer information is included in one or both of: an HDMI Video Format Identification Code (HDMI_VIC), and an HDMI 3D Format (HDMI_3D_FMT) code.

6. The source device of claim 1, wherein the three-dimensional transfer information comprises: a pixel repeat rate, a format of the multiplexing scheme, and the number of frames in the next unit of the sequence of frames.

7. The source device of claim 1, wherein the multiplexing scheme comprises one of:
field alternating multiplexing;
line alternating multiplexing;
side by side frame multiplexing;
two-dimensional and depth frame multiplexing; and
two-dimensional, depth, graphics and graphics depth frame multiplexing.

8. The source device of claim 1, wherein each unit is a period between two consecutive vertical synchronization signals.

9. A display device for rendering three-dimensional images, comprising:
a three-dimensional display;
an input circuit that receives a three-dimensional display signal that comprises a sequence of frames corresponding to three-dimensional image data in a three-dimensional video transfer format;
wherein the sequence of frames comprises units, each unit corresponding to a number of frames arranged according to a multiplexing scheme for composing video information that forms each three-dimensional image that is to be displayed on the three-dimensional display;
wherein the three-dimensional video transfer format comprises a video data period during which pixels of video data are transmitted and a data island period during which auxiliary data is transmitted; and
wherein the auxiliary data includes three-dimensional transfer information comprising at least information about the multiplexing scheme, including the number of frames in a next unit in the sequence of frames;
a processor circuit that:
processes the three-dimensional transfer information about the multiplexing scheme to determine the number of frames in the next unit in the sequence of frames;
processes the number of frames in the next unit to create a next three-dimensional image based on the multiplexing scheme; and
provides the next three-dimensional image to the three-dimensional display.

10. The display device of claim 9, wherein the auxiliary data is transmitted via packets, and the three-dimensional transfer information is included in one or more information frame packets.

11. The display device of claim 10, wherein the auxiliary data conforms to a High Definition Multimedia Interface (HDMI) standard.

12. The display device of claim 11, wherein the auxiliary data is included in Auxiliary Video Information (AVI) of the High Definition Multimedia Interface, which is transmitted once per unit.

13. The display device of claim 12, wherein the three-dimensional transfer information is included in one or both of: an HDMI Video Format Identification Code (HDMI_VIC), and an HDMI 3D Format (HDMI_3D_FMT) code.

14. The display device of claim 9, wherein the three-dimensional transfer information comprises: a pixel repeat rate, a format of the multiplexing scheme, and the number of frames in the next unit of the sequence of frames.

15. The display device of claim 9, wherein the multiplexing scheme comprises one of:
field alternating multiplexing;
line alternating multiplexing;
side by side frame multiplexing;
two-dimensional and depth frame multiplexing; and
two-dimensional, depth, graphics and graphics depth frame multiplexing.

16. The display device of claim 9, wherein each unit is a period between two consecutive vertical synchronization signals.

17. A method of communicating three-dimensional image data from a source device to a display device, comprising:
at the source device:
receiving the three-dimensional image data at the source device;

generating a three-dimensional display signal that comprises a sequence of frames corresponding to the three-dimensional image data in a three-dimensional video transfer format;

wherein the sequence of frames comprises units, each unit corresponding to a number of frames arranged according to a multiplexing scheme for composing video information that forms each three-dimensional image that is to be displayed on the display device;

wherein the three-dimensional video transfer format comprises a video data period during which pixels of video data are transmitted and a data island period during which auxiliary data is transmitted;

wherein the auxiliary data includes three-dimensional transfer information comprising at least information about the multiplexing scheme, including the number of frames in a next unit in the sequence of frames, thereby enabling the display device to determine the number of frames in the next unit and correspondingly form a next three-dimensional image for display on a three-dimensional display; and communicating the three-dimensional display signal to the display device.

18. The method of claim 17, further comprising:
at the display device:
  receiving the three-dimensional display signal;
  processing the three-dimensional transfer information about the multiplexing scheme to determine the number of frames in the next unit in the sequence of frames;
  processing the number of frames in the next unit to create a next three-dimensional image based on the multiplexing scheme; and
  providing the next three-dimensional image to a three-dimensional display.

19. The method of claim 18, wherein each unit is a period between two consecutive vertical synchronization signals.

20. The method of claim 17, wherein the auxiliary data is included in Auxiliary Video Information (AVI) of a High Definition Multimedia Interface (HDMI), which is transmitted once per unit; wherein the three-dimensional transfer information is included in one or both of: an HDMI Video Format Identification Code (HDMI_VIC), and an HDMI 3D Format (HDMI_3D_FMT) code; and wherein the three-dimensional transfer information comprises: a pixel repeat rate, a format of the multiplexing scheme, and the number of frames in the next unit of the sequence of frames.

* * * * *